Dec. 4, 1923.  1,476,631
R. MEISNER ET AL
AUTOMOBILE HEADLIGHT
Filed Sept. 7, 1922
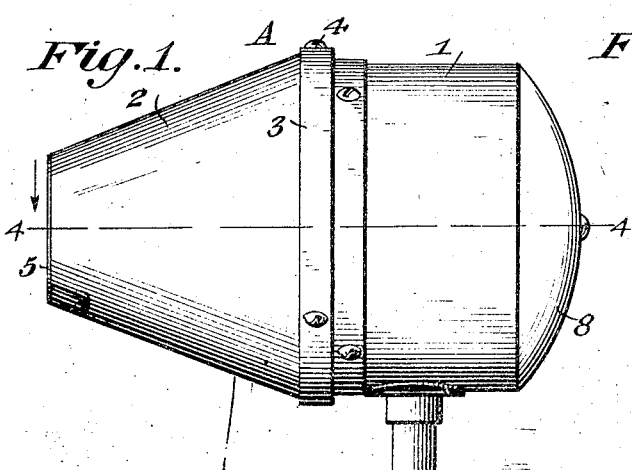
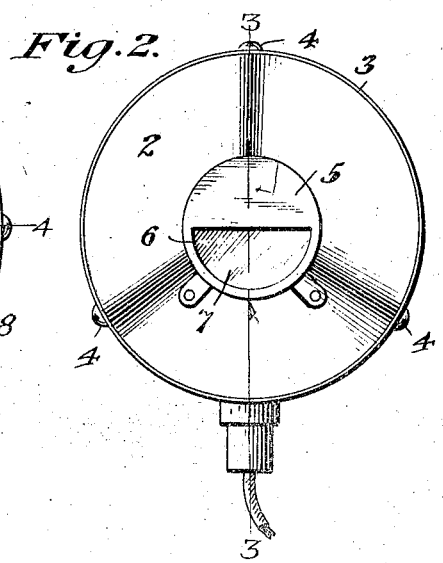
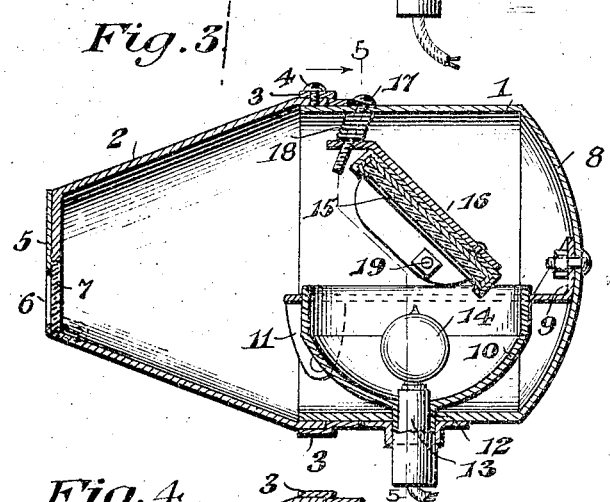
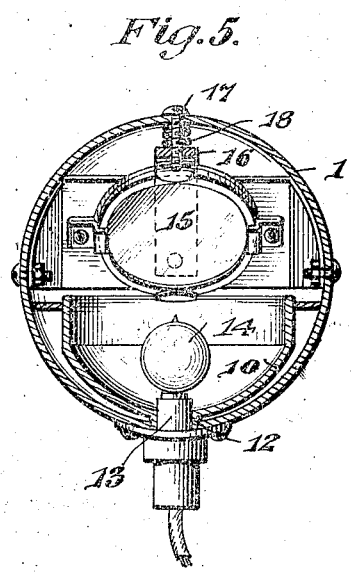
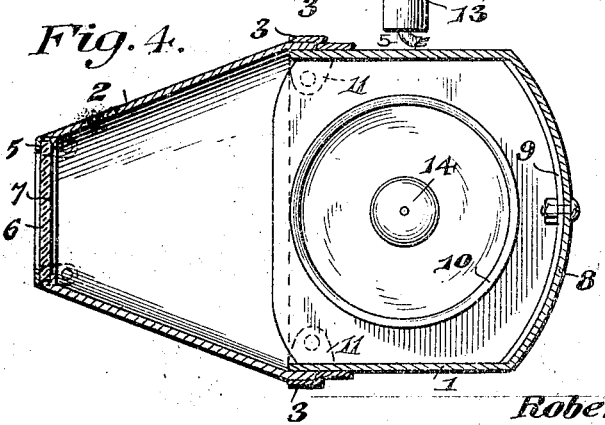
Robert Meisner
Ferrin A. Roe,
INVENTORS
BY
Geo. F. Kimmel
ATTORNEY.

Patented Dec. 4, 1923.

1,476,631

UNITED STATES PATENT OFFICE.

ROBERT MEISNER AND FERRIN A. ROE, OF TRAER, IOWA.

AUTOMOBILE HEADLIGHT.

Application filed September 7, 1922. Serial No. 586,704.

*To all whom it may concern:*

Be it known that we, ROBERT MEISNER and FERRIN A. ROE, citizens of the United States, residing at Traer, in the county of Tama and State of Iowa, have invented certain new and useful Improvements in Automobile Headlights, of which the following is a specification.

This invention has reference to automobile headlights, and is particularly intended to provide an automobile headlight of the antiglare type, whereby there shall be no displaced rays to be wasted but all rays of light are utilized.

The invention comprises a casing of peculiar shape, with a source of light therein comprising an incandescent electric lamp bulb preferably of the battery type and located in a reflector bowl in the focus thereof and directed toward an inclined mirror also contained within the casing in such position that the rays of light are directed toward one end of the bowl of the casing where there is a light emitting opening of circumscribed area, the plane reflector and the bowl or focusing reflector coacting to condense and reflect the rays of light through the circumscribed opening to a point on the road in front of the automobile distant from the headlight, the reflector bowl and the mirror associated therewith coacting to condense the rays of light and direct them in a manner to prevent any glare reaching the eyes of an observer in front of the automobile, the reflected rays of light being directed in a low path below the eyes of the observer, while at the same time the illuminating quality of the rays of light being ample to light up the roadway so as to amply show any obstructions that may be present.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a side elevation of a headlight embodying the invention.

Fig. 2 is a front elevation as seen from the left hand end of the showing of Fig. 1.

Fig. 3 is a section on the line 3—3 of Fig. 2.

Fig. 4 is a section on the line 4—4 of Fig. 1.

Fig. 5 is a section on the line 5—5 of Fig. 3.

Referring to the drawings, there is shown a casing A composed of a cylindrical member 1 and in alinement with a conical projection 2 united by a coupling section 3 held together in telescoping relation by screws 4 or otherwise.

The conical section 2 of the casing terminates in a plane end 5 having a cut-out 6 of semi-circular contour and covered by a similarly shaped pane 7 of glass, preferably plate glass because of its great transparency.

That end of the cylindrical portion 1 of the casing A remote from the conical portion 2 is rounded as shown at 8 to accommodate parts to be described.

Secured to the end 8 of the member 1 is a bracket 9 constituting a support for a concave reflector 10 in the shape of a bowl, further supported by other brackets 11 riveted or otherwise made fast to the interior of the cylindrical member 1. The brackets 9 and 11 secured to the interior walls of the casing section 1 constitute a rigid support therefor and the reflector 10, is provided with a central neck 12 extending through one side of the casing member 1 to the exterior thereof and shaped to constitute a holder or support for receiving and carrying the basic end 13 of a lamp socket to receive an incandescent electric lamp 14 of the battery type, which lamp is carried at the focal point of the reflector 10 whereby rays of light are projected by the reflector 10 in parallel or somewhat convergent relation.

Located within the casing member 1 is a mirror 15 carried by a support 16 made fast to the inner wall of the casing 1 above the mouth of the reflector 10 and held thereto by an adjusting screw 17 associated with the spring 18 surrounding said screw so that the mirror may be adjusted as desired to vary the beam of light directed by the mirror from the lamp 14 through the window 7. The mirror 15 is further supported by bolts 19 serving as pivot bolts.

When the parts described are installed and adjusted, the light being emitted by the lamp 14, is converted into parallel or somewhat convergent rays, and these rays are directed through the contracted window 7 to the exterior thereof and in a direction to strike upon the roadway within moderate distance from the headlight thus preventing any direct rays of light from the lamp 14 from rising high enough to cause a glare in the eyes of the observer who may be located in front of the automobile. This, by avoiding direct line of vision to the headlight lamp 14, effectively prevents any glare from reaching the eyes of the observer and the blinding effects of the headlight is thereby avoided. The screw 17 is accessible from the exterior of the headlight and hence the tilt of the reflector 15 is adjustable at the will of the operator to avoid any glare occurring.

What is claimed is:—

1. In a light projecting apparatus, a cylindrical casing having a closed rear end, a frusto-conical casing aligning with and secured at its rear end to the open end of the said other casing and provided with a removable semi-circular light emitting means at the front end thereof, a vertically positioned concave reflecting element arranged within and supported by the lower part of said cylindrical casing, a vertically disposed lamp mounted within and centrally of said reflecting element, a horizontally disposed support carrying an upstanding bracket at the rear thereof for attachment with said closed rear end, said support surrounding said reflecting element at its upper edge, oppositely disposed brackets carried by the cylindrical casing near its front edge for further securing said support, a supporting plate carried by the cylindrical casing above the reflecting element having its opposite edges downturned to provide attaching flanges, said flanges having apertures for the passage of supporting bolts, and a mirror retained by said supporting plate at an inclination with respect to the reflecting element for projecting the light rays through the said light emitting means.

2. In a light projecting apparatus, a cylindrical casing having a closed rear end, and further having an aperture through the lower part thereof, a frusto-conical casing aligning with and secured at its rear end to the open end of the said other casing and provided with a removable semi-circular light emitting means at the front end thereof, a vertically positioned concave reflecting element arranged within said cylindrical casing and having a tube like member formed centrally thereof and passing downwardly through the aperture in the lower side of said casing, a vertically disposed lamp mounted within and centrally of said reflecting element, a horizontally disposed support carrying an upstanding bracket at the rear thereof for attachment with the said closed rear end, said support surrounding said reflecting element at its upper edge and further being of the same contour as the cylindrical casing, oppositely disposed brackets carried by the cylindrical casing near its outer edge for further securing said support, a pivoted supporting plate carried by the cylindrical casing above the reflecting element, a bracket attached to the back of said plate and extending forwardly from the top edge thereof, an adjusting means extending through and downwardly from the top of the cylindrical casing and contacting with said bracket for the adjustment of said plate, and a mirror retained by said supporting plate at an inclination with respect to the reflecting means for projecting the light rays through the said light emitting means.

In testimony whereof, we affix our signatures hereto.

ROBERT MEISNER.
FERRIN A. ROE.